United States Patent [19]

Piazza et al.

[11] Patent Number: 4,621,537
[45] Date of Patent: Nov. 11, 1986

[54] GEAR SELECTION AND ENGAGEMENT DEVICE FOR A MOTOR VEHICLE TRANSMISSION

[75] Inventors: Romano Piazza, Brescia; Armando Gregori, Breno, both of Italy

[73] Assignee: Iveco Fiat S.p.A., Turin, Italy

[21] Appl. No.: 621,042

[22] Filed: Jun. 15, 1984

[30] Foreign Application Priority Data

Jun. 17, 1983 [IT] Italy ................................. 67675 A/83

[51] Int. Cl.⁴ .......................... G05G 5/08; G05G 9/12
[52] U.S. Cl. .................................... 74/477; 74/473 R
[58] Field of Search .............................. 74/473 R, 477

[56] References Cited

U.S. PATENT DOCUMENTS 4,503,727   3/1985   Ballendux ........................... 74/477

FOREIGN PATENT DOCUMENTS 293488    8/1916   Fed. Rep. of Germany .
1011736   7/1957   Fed. Rep. of Germany .
1286859   1/1969   Fed. Rep. of Germany .
57-29120  2/1982   Japan ................................... 74/477
1254987  11/1971   United Kingdom .

Primary Examiner—Allan D. Herrmann
Attorney, Agent, or Firm—Michael N. Meller

[57] ABSTRACT

Gear selection and engagement device for a motor vehicle transmission, the said device comprising a shaft moving in the direction of and round its own axis and constituting a support for a number of hubs each integral with a corresponding fork; the said device also comprising a first set of teeth projecting radially from the said shaft and being axially and torsionally integral with the same, one of the said hubs being arranged between two adjacent teeth on the said first set; the said device also comprising a second set of teeth projecting radially from the said shaft, being torsionally integral with it and being axially fixed in relation to the transmission case; each of the said hubs having at least one pair of axial grooves designed to accommodate the teeth in the said first and second set; the said grooves being arranged round the circumference of each hub in such a preset manner that, for a preset angular position of the said shaft corresponding to a preset gear selection, all the teeth in the first set are aligned axially with corresponding grooves on the said hubs with the exception of the teeth adjacent to a preset hub belonging to the fork which must be shifted axially for engaging the said gear.

8 Claims, 6 Drawing Figures

GEAR SELECTION AND ENGAGEMENT DEVICE FOR A MOTOR VEHICLE TRANSMISSION

BACKGROUND OF THE INVENTION

The present invention relates to a gear selection and engagement device designed for assembly on a motor vehicle transmission of the type comprising a number of gears moved axially by corresponding control forks, each of the gears being designed to be moved in to such a position as to mesh with another axially fixed gear, so as to form a gear pair with a preset transmission ratio.

SUMMARY OF THE INVENTION

One aim of the present invention is to provide a gear selection and engagement device for use on the abovementioned type of transmission, the device comprising a single moving control shaft designed to shift the said forks which are needed for both gear selection and engagement. Another aim of the present invention is to provide a device of the abovementioned type designed to control a large number of forks and, therefore, employable on transmissions with a particularly large number of gears, e.g. the transmission on an industrial vehicle. A further aim of the present invention is to provide a highly compact device ensuring smooth, reliable operation. With these aims in view, the present invention relates to a gear selection and engagement device for a motor vehicle transmission comprising a number of axially moving gears, each designed to be moved into such a position as to mesh with another axially fixed gear so as to form a gear pair with a preset transmission ratio, the axially moving gears being controlled by corresponding axially moving control forks, characterized by the fact that the device comprises a shaft moving in the direction of and rotating about its own axis in relation to the transmission case by means of manually operated control means, the shaft constituting a support for a number of hubs each integral with a corresponding fork; a first set of teeth projecting radially from the shaft and being axially and torsionally integral with the shaft and one of the said hubs being arranged between two adjacent teeth on the first set; a second set of teeth projecting radially from the shaft, being torsionally integral with it and axially fixed in relation to the case and one of the said hubs being arranged between two adjacent teeth on the second set; each of the hubs having at least one pair of axial grooves designed to accommodate teeth on the first and second sets when the said shaft is shifted axially by the control means so as to prevent the relative hubs from moving as a consequence of the axial displacement; the grooves being arranged round the circumference of each hub in such a preset manner that, for a preset angular position of the shaft corresponding to a preset gear selection, all the teeth in the first set are aligned axially with corresponding grooves on the hubs, with the exception of the teeth adjacent to a preset hub belonging to the fork which must be shifted axially for engaging the preset gear, so that, following subsequent axial displacement of the said shaft, only the hub preset for engaging the gear is shifted axially by one of the adjacent teeth in the said first set; with the shaft in the angular position, the second set teeth adjacent to the preset hub being aligned with the corresponding grooves on the hub and all the other second set teeth being arranged essentially contacting the other hubs, so as to prevent the hubs from moving axially during axial displacement of the hub selected for engaging the gear.

BRIEF DESCRIPTION OF THE DRAWINGS

A preferred embodiment of the present invention will now be described, by way of a non-limiting example, with reference to the attached drawings in which.

DETAILED DESCRIPTION OF THE INVENTION

The device covered by the present invention is designed for use on a motor vehicle transmission (not shown) comprising a number of axially moving gears, each designed to be moved by a corresponding fork (1) into such a position as to mesh with another axially fixed gear, so as to form a gear pair with a preset transmission ratio.

In the arrangement shown, the device is provided with three such forks designed to shift corresponding gears axially in two opposite directions.

Figure 2:
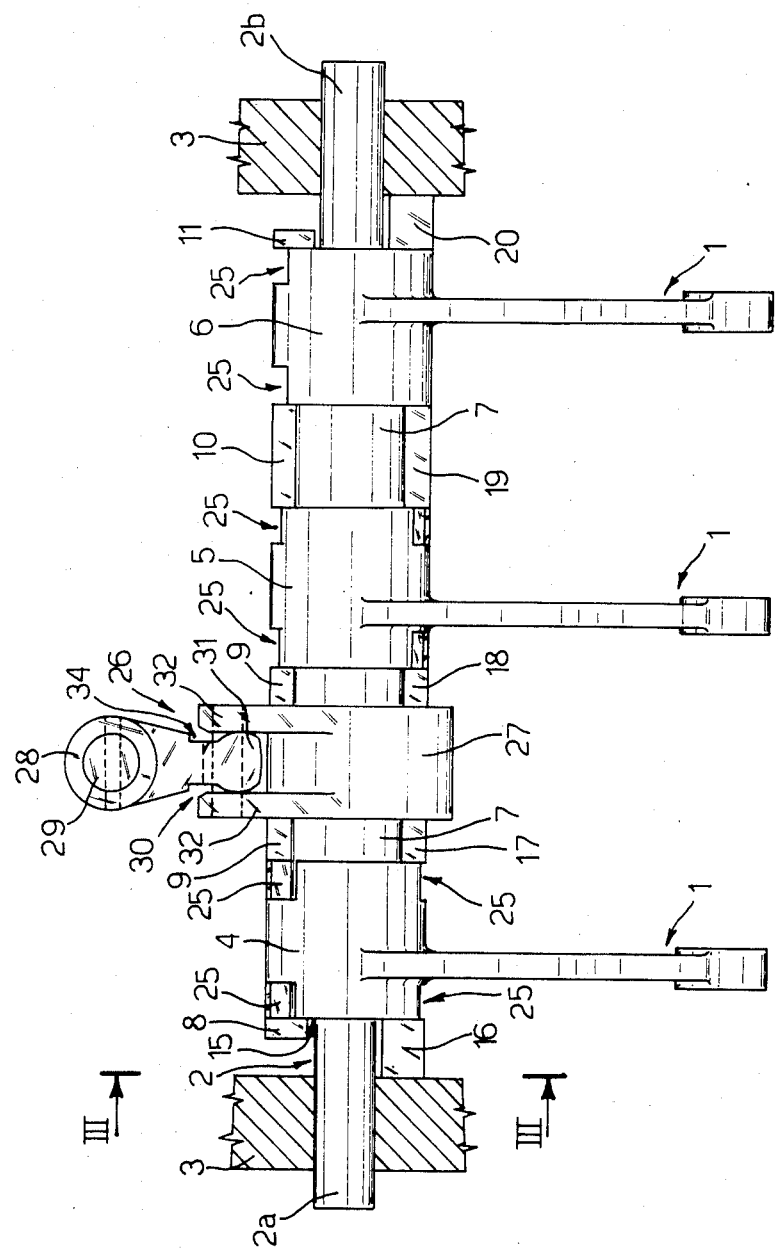
FIG. 2 shows a side view of the device.
Figure 3:
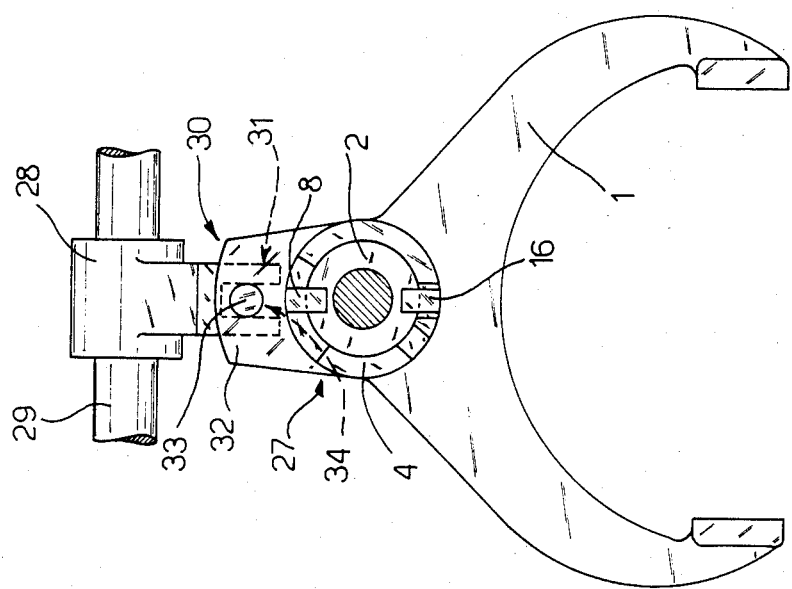
FIG. 3 shows a cross section of the device of FIG. 2 taken along line III—III.

The device comprises a shaft (2) moving in the direction of and rotating about its own axis in relation to the transmission case. For such a purpose, as shown in FIG. 2, the end sections (2a, 2b) of the shaft are mounted in corresponding bearings formed in walls 3 of the case.

Figure 1:
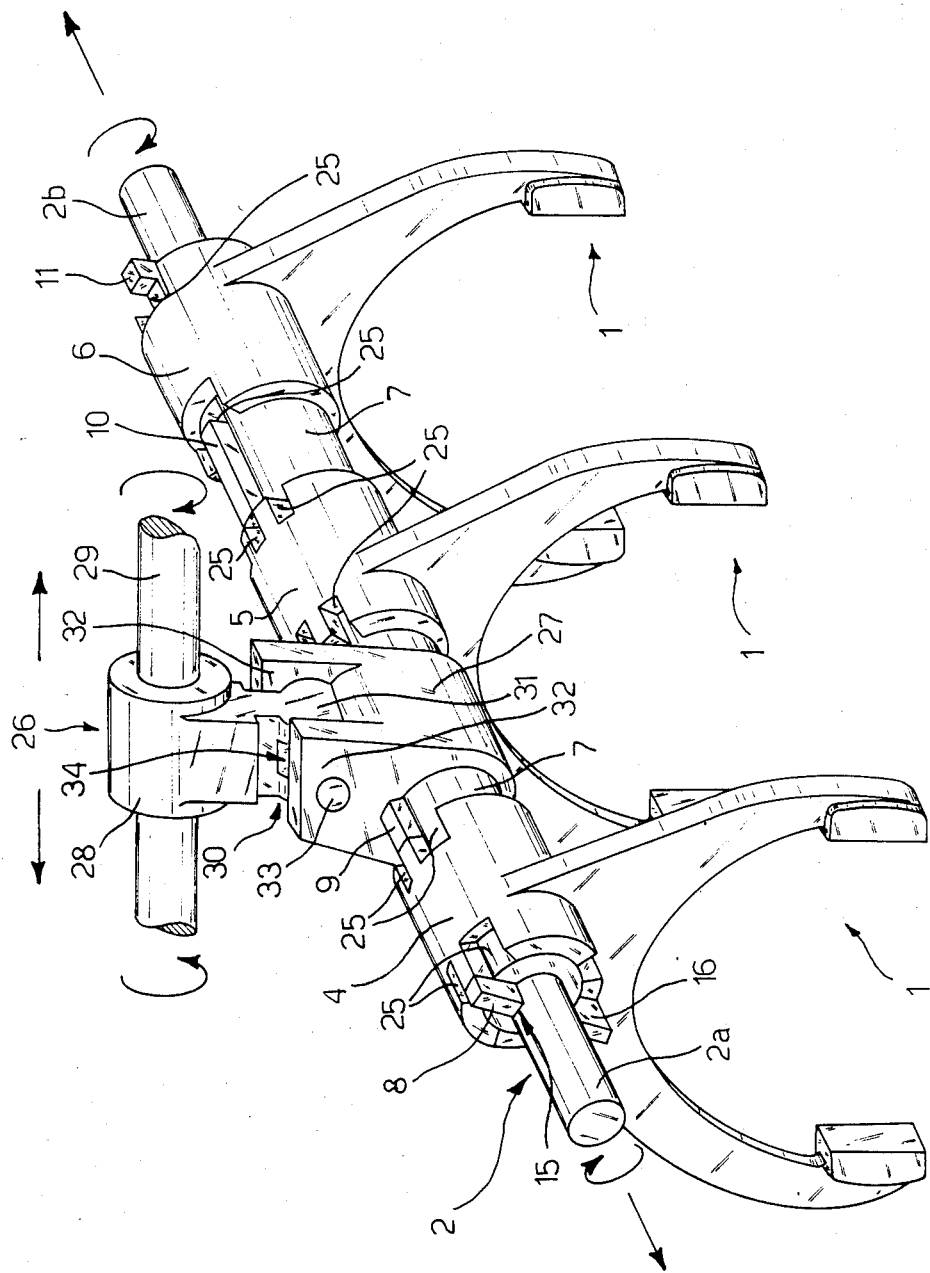
FIG. 1 shows a view in perspective of the gear selection and engagement device according to the present invention.

Shaft 2 constitutes a support for a number of sleevelike hubs (4, 5, 6) each having a bore surface, an outer circumferential surface and a pair of opposing surfaces and each integral with a corresponding fork (1) as shown clearly in FIG. 1. The hubs are thus free to move axially and to rotate in relation to the center part (7) of shaft 2, the center part (7) being greater in diameter than end sections 2a and 2b of the shaft. The device also comprises a first set of teeth projecting radially from shaft 2 and being axially and circumferentially fixed relative thereto. These teeth are arranged on the shaft so that one of hubs 4, 5 or 6 fits between two adjacent teeth. Consequently, in the arrangement shown, which provides for only three hubs, the teeth are four in number (8, 9, 10, 11) as shown clearly in FIG. 4. For conveniently forming the teeth, provision is made for key 14 housed inside a corresponding longitudinal groove (15) formed in the center part (7) of shaft 2. The teeth project from the same side of the key, the base section of which is housed in the groove.

The device also comprises a second set of teeth further projecting radially from the center part (7) of shaft 2 and being circumferentially fixed relative thereto. the shaft and fixed axially in relation to the transmission case. As for the first set of teeth, one of hubs 4, 5 or 6 is arranged between two adjacent teeth of the second set. In the arrangement shown, the said radial teeth are five in number (16, 17, 18, 19, 20) as shown clearly in FIG. 4. As in the case of the first set, the teeth in the second set may be formed by means of a key (21) also housed in a corresponding longitudinal groove (22) formed in the part (7) of shaft 2, these teeth projecting from one side of the key and the base section of the latter being housed in the groove.

To fix the teeth in the second set axially in relation to the transmission case, end teeth 16 and 20 of key 21 abut the surfaces of walls 3, whereas, to enable axial movement of shaft 2 in relation to the key 21, which is fixed axially, the key is allowed to slide inside the corresponding groove 22.

Each hub 4, 5 and 6 is provided with at least one pair of axial grooves (25) which extend axially from the opposing end faces of the respective hub along part of the axial extent of the hub and which extend radially from the bore surface to the outer circumferential surface of the respective hub. Each groove is designed to accommodate, in the manner described hereafter, teeth in both the first and second set when shaft 2 is displaced axially.

Axial displacement and rotation of shaft 2 are controlled by control means, indicated as a whole by number 26, and comprising a first bushing (27), integral with shaft 2, and a second bushing (28), integral with a control bar (29) arranged essentially perpendicular to shaft 2. The two bushings are connected by means of an essential ly spherical coupling (30) comprising a head (31) integral with bushing 28 and connected between a pair of tabs (32) integral with bushing 27. The side surfaces of the head are conveniently cylindrical and designed to rest on corresponding flat surfaces of tabs 32. Furthermore, a pin (33) (FIG. 1) inserted inside bores formed in the tabs fits through a slot (34) formed in head 31. Obviously, therefore, with such a construction arrangement, each rotation of control bar 29 about its own axis is accompanied by axial tranversing of shaft 2, whereas tranversing of the control bar is accompanied by rotation of the shaft.

Grooves 25 on each hub 4, 5 and 6 are arranged around the circumference of the associated hub in such a preset manner that, for a preset angular position of shaft 2 corresponding to a preset gear selection, all the teeth in the first set are essentially aligned with corresponding grooves on the hubs, with the exception of the teeth adjacent to a preset hub belonging to the fork which must be displaced axially for engaging the said preset gear.

Figure 4:
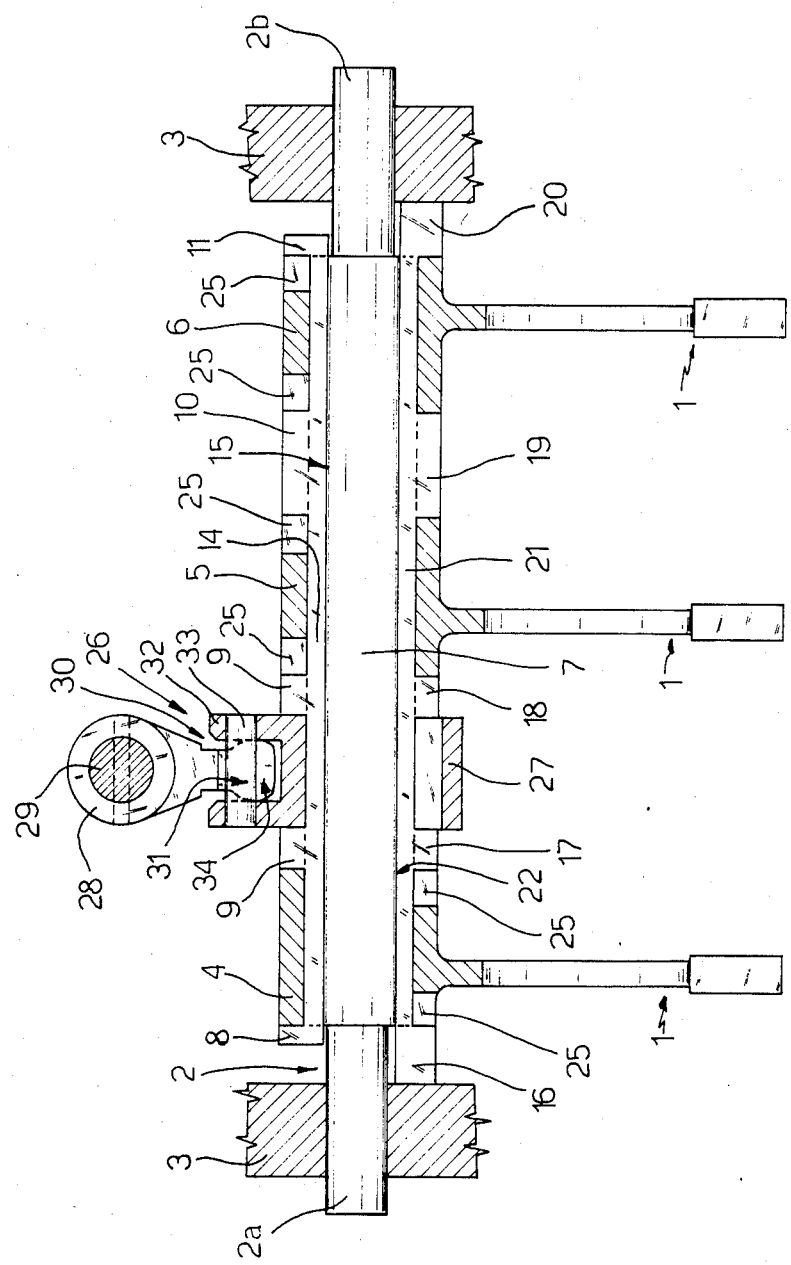
FIG. 4 shows an axial longitudinal section of the device.

In the arrangement shown, for the preset angular position of shaft 2 shown in FIG. 4, each of hubs 5 and 6 is provided on opposite sides with a pair of grooves (25) designed to align with teeth 9, 10 and 11, as shown clearly in FIG. 4, whereas no grooves are provided on hub 4 for aligning with teeth 8 and 9.

Grooves 25 on each hub are arranged in such a manner that, with shaft 2 in the above-mentioned angular position, the teeth in the second set are aligned with corresponding grooves (25) on the only hub to be displaced for engaging the preset gear, whereas all the other teeth in the second set are arranged essentially contacting the other hubs, so as to prevent axial displacement of the hubs during axial displacement, in the manner hereafter described, of the preset hub. Consequently, in the arrangement shown in FIG. 4 and for the angular position of shaft 2 shown therein, grooves 25 are provided only on hub 4 in alignment with teeth 16 and 17 in the second set, whereas no grooves 25 are provided on the other hubs (5, 6) for alignment with the other teeth (18, 19, 20) in the second set.

Clearly, the arrangement of grooves 25 on the hubs depends on the displacement envisaged for forks 1 and will become clearer from the following examination of the way in which the device operates.

With reference to FIG. 4 showing the device covered by the present invention with none of the gears engaged, assume a gear engagement is required, such engagement being performed by shifting rightwards, in FIG. 4, fork 1 on the left of the drawing. Axial traversing of control bar 29, which turns bushing 27 and, consequently, also shaft 2, moves shaft 2 into the angular position shown in FIG. 4 in which teeth 9, 10 and 11 in the first set are aligned with corresponding grooves 25 on hubs 5 and 6. Axial displacement of the control bar thus serves to select a preset gear.

Figure 5:
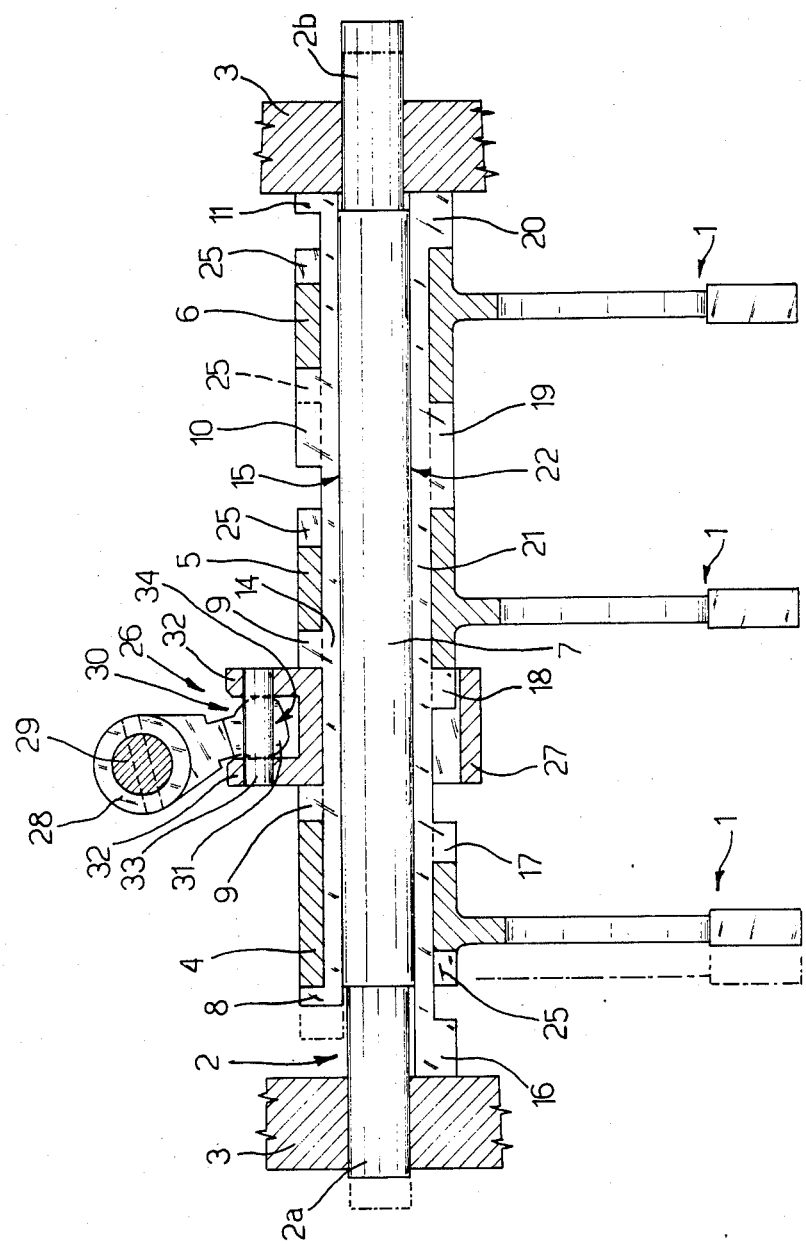
FIGS. 5 and 6 show two cross sections of the device, as in FIG. 4, but in two different operating positions corresponding to the engagement of two different gears.

In the abovementioned preset gear selection arrangement, teeth 18, 19 and 20 in the second set are arranged essentially on each side of hubs 5 and 6, thus locking them axially and preventing any displacement during the following engagement operation. The latter is achieved by rotating control bar 29, which is accompanied by axial traversing of bushing 27 and, consequently, also of shaft 2. If such rotation is anticlockwise in FIG. 4, it is accompanied by rightward displacement (FIG. 4) of the shaft (FIG. 5) during which tooth 8 shifts hub 4 in the same direction, whereas teeth 9 and 10 simply fit into the corresponding grooves (25) formed in respective hubs 5 and 6. Clearly, therefore, during such displacement, corresponding to actual engagement of one of the gears, only the hub involved in the engagement is displaced while the others are locked in the idle position by the teeth in the second set.

If another gear is to be engaged, however, such engagement being achieved by shifting leftwards fork 1 on the left of FIG. 4, the selection arrangement is the same as that already described, except that for engaging the gear, control bar 29 is turned clockwise in FIG. 4 so as to shift shaft 2 and, consequently, also hub 4 leftwards in FIG. 4.

Figure 6:
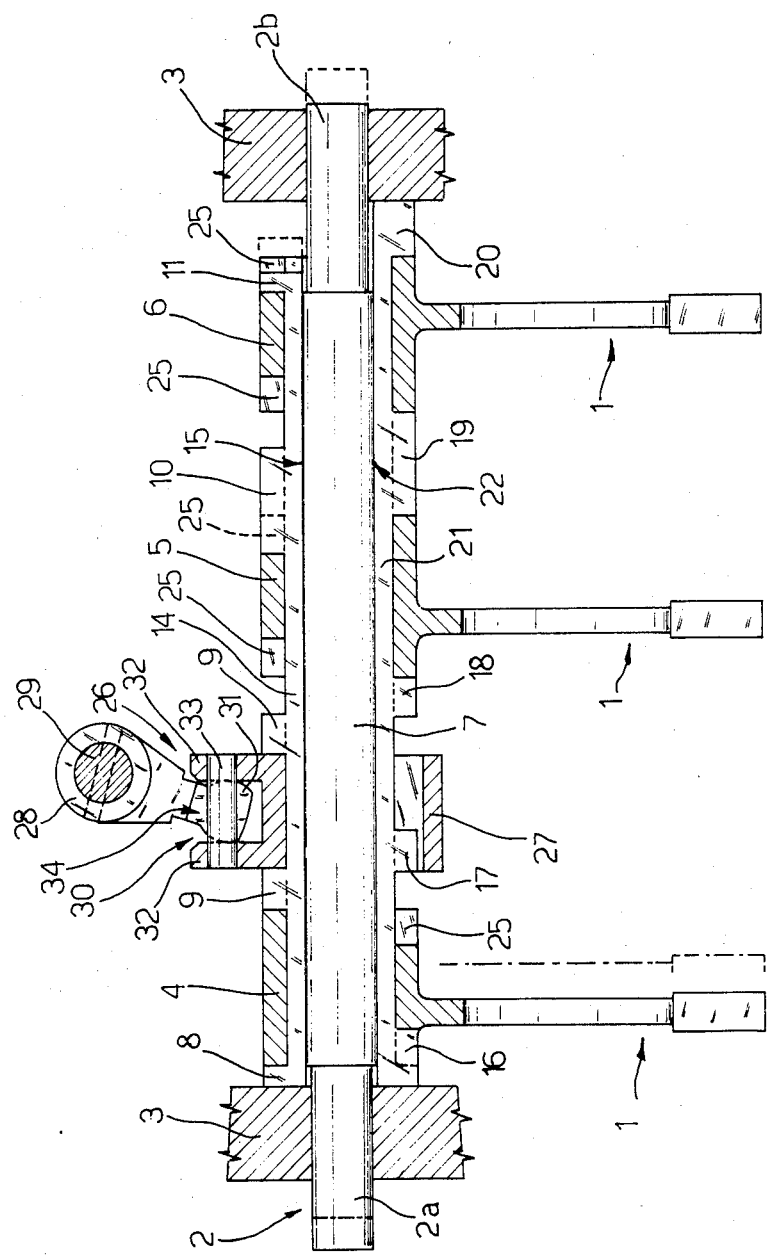

This new engagement set-up is shown in FIG. 6. As this clearly shows, during such displacement, teeth 10 and 11 in the first set fit into corresponding grooves 25 on corresponding hubs 5 and 6 which are locked firmly in the idle position by the teeth in the second set.

A different gear selection may be achieved by turning shaft 2 into an angular position other than the one already described. This new position may correspond to such a preset arrangement of grooves 25 on the three hubs (4, 5, 6) as to determine, following axial displacement of the shaft, axial displacement of another fork in a preset direction or the simultaneous displacement of two of the forks.

Obviously, by providing each hub (4, 5, 6) with an appropriate number of grooves (25), the axial displacement of one or more hubs may be controlled while, at the same time, locking the others axially.

To those skilled in the art it will be clear that changes can be made to the above-described embodiment of the present invention, both in terms of form and arrangement of the various parts involved, without, however, departing from the scope of the present invention.

We claim:

1. A gear selection and engagement device for pairing axially movable gears with axially fixed gears in a motor vehicle transmission so as to form a gear pair having a predetermined transmission ratio, comprising:
   (a) a transmission case;
   (b) a shaft displaceably and rotatably mounted in said transmission case, (c) a manually operable control means connected to said shaft for controllably displacing said shaft along and rotating said shaft about a longitudinal axis;

(d) a plurality of sleeve-like hubs rotatably and axially displaceably mounted on said shaft, each of said hubs having a bore surface, an outer circumferential surface and a pair of opposing end surfaces, and having a pair of control forks integrally connected thereto;

(e) a first set of teeth projecting radially from said shaft in an axially spaced relationship such that each of said hubs is arranged between two adjacent teeth of said first set, said first set of teeth being axially and circumferentially fixed relative to said shaft; and (f) a second set of teeth projecting radially from said shaft in an axially spaced relationship such that each of said hubs is arranged between two adjacent teeth of said second set, said second set of teeth being axially slidable and circumferentially fixed relative to said shaft and axially fixed relative to said transmission case, wherein each of said hubs has at least one pair of grooves extending axially from respective endfaces of said respective hub, each of said grooves extending axially from a respective one of said opposing end surfaces along part of the axial extent of said respective hub, extending radially from said bore surface to said outer circumferential surface of said respective hub, and being formed to receive a corresponding one of said teeth, said grooves being arranged at predetermined positions along the circumference of each hub such that when one of said grooves of one of said hubs is aligned with a corresponding one of said second set of teeth in response to rotation of said shaft, one of said grooves of each hub other than said one hub is aligned with a corresponding one of said first set of teeth.

2. The gear selection and engagement device of claim 1, wherein when said one groove of said one hub is aligned with said corresponding one of said second set of teeth, none of said grooves of said hubs other than said one hub are aligned with a corresponding one of said second set of teeth.

3. The gear selection and engagement device of claim 1, wherein when said one groove of said one hub is aligned with said corresponding one of said second set of teeth, none of said grooves of said one hub are aligned with a corresponding one of said first set of teeth.

4. The gear selection and engagement device of claim 1, wherein said shaft has a first axial groove formed therein and said first set of teeth are integrally formed on a first key, said first key being fixedly mounted in said first axial groove.

5. The gear selection and engagement device of claim 4, wherein said shaft has a second axial groove formed therein and said second set of teeth are integrally formed on a second key, said second key being axially slidably mounted in said second axial and axially abutting said transmission case.

6. A gear selection and engagement device for pairing axially movable gears with axially fixed gears in a motor vehicle transmission so as to form a gear pair having a predetermined transmission ratio, comprising:

(a) a transmission case;

(b) a shaft displaceably and rotatably mounted in said transmission case;

(c) a manually operable control means connected to said shaft for controllably displacing said shaft along and rotating said shaft about a longitudinal axis;

(d) a plurality of hubs rotatably and axially displaceably mounted on said shaft, each of said hubs having a pair of control forks integrally connected thereto;

(e) a first set of teeth projecting radially from said shaft in an axially spaced relationship such that each of said hubs is arranged between two adjacent teeth of said first set, said first set of teeth being axially and circumferentially fixed relative to said shaft; and (f) a second set of teeth projecting radially from said shaft in an axially spaced relationship such that each of said hubs is arranged between two adjacent teeth of said second set, said second set of teeth being axially slidable and circumferentially fixed relative to said shaft and axially fixed relative to said transmission case, wherein each of said hubs has at least one pair of grooves extending axially from respective endfaces of said respective hub, each of said grooves being formed to receive a corresponding one of said teeth, said grooves being arranged at predetermined positions along the circumference of each hub such that when one of said grooves of one of said hubs is aligned with a corresponding one of said second set of teeth in response to rotation of said shaft, one of said grooves of each hub other than said one hub is aligned with a corresponding one of said first set of teeth, wherein when said one groove of said one hub is aligned with said corresponding one of said second set of teeth, none of said grooves of said hubs other than said one hub are aligned with a corresponding one of said second set of teeth, and wherein said control means comprises a first bushing integrally connected to said shaft and coaxial therewith, said first bushing having an axial groove for receiving said second key, a control rod displaceable along and rotatable about an axis substantially perpendicular to said longitudinal axis of said shaft, and a second bushing integrally connected to said control rod and operatively coupled to said first bushing such that said first and second bushings are relatively rotatable about a first axis substantially parallel to said longitudinal axis and a second axis substantially parallel to said axis about which said control rod is rotatable.

7. The gear selection and engagement device of claim 1, wherein said shaft is rotated for gear selection when said control rod is axially displaced and said shaft is axially displaced for gear engagement when said control rod is rotated.

8. The gear selection and engagement device of claim 5, wherein said first and second axial grooves are formed at diametrally opposed positions along said shaft.

* * * * *